United States Patent [19]

Yezrielev et al.

[11] Patent Number: 5,166,289
[45] Date of Patent: Nov. 24, 1992

[54] THERMOSET COATING COMPOSITION HAVING IMPROVED HARDNESS

[75] Inventors: Albert I. Yezrielev, Seabrook, Tex.; William E. Wellman, Edison, N.J.

[73] Assignee: Exxon Chemical Patents Inc., Linden, N.J.

[21] Appl. No.: 630,298

[22] Filed: Dec. 19, 1990

[51] Int. Cl.$^5$ .................. C08F 20/00; C08F 20/10
[52] U.S. Cl. ..................... 525/443; 525/519
[58] Field of Search ................ 525/443, 519

[56] References Cited

U.S. PATENT DOCUMENTS

| | | | |
|---|---|---|---|
| 3,770,698 | 11/1973 | Riew | 260/47 |
| 3,787,520 | 1/1974 | Labana et al. | 260/836 |
| 3,966,837 | 6/1976 | Riew et al. | 260/837 |
| 4,025,578 | 5/1977 | Siebert | 260/837 |
| 4,028,111 | 6/1977 | Iwasaki et al. | 96/75 |
| 4,079,034 | 3/1978 | Lemper et al. | 260/45.7 |
| 4,124,566 | 11/1978 | Saiki et al. | 528/177 |
| 4,216,298 | 8/1980 | Schreckenberg et al. | 525/439 |
| 4,281,101 | 7/1981 | Schreckenberg et al. | 528/196 |
| 4,297,455 | 10/1981 | Lindner et al. | 525/439 |
| 4,365,039 | 12/1982 | Blegen | 525/440 |
| 4,535,132 | 8/1985 | Ambrose et al. | 525/443 |
| 4,713,137 | 12/1987 | Sexton | 156/233 |
| 4,927,903 | 5/1990 | Schreckenberg et al. | 528/176 |

FOREIGN PATENT DOCUMENTS

1042581 11/1978 Canada .
2316289 10/1976 Fed. Rep. of Germany ...... 525/443

Primary Examiner—James J. Seidleck
Assistant Examiner—W. R. H. Clark

[57] ABSTRACT

The present invention provides for amino-crosslinkable coating formulations based on a mixture of a di or polyhydroxy functional polymeric component selected from the group consisting of diesters, polyesters, alkyd polymers, acrylic polymers and polycarbonate polymers, a methylol (alkoxymethyl) amino crosslinking agent and a bis-aromatic polyhydric phenol component having the structure of formula I:

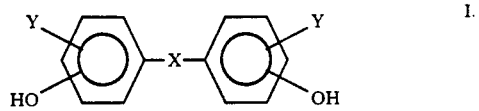

wherein X is selected from the group consisting of carbon to carbon covalent bond, oxygen, sulfur, —S—S—, —CO—, —SO—, —SO$_2$— and a divalent organic radical having a molecular weight less than about 400, and wherein Y is independently selected from the group consisting of hydrogen, halogen, C$_1$ to C$_4$ alkyl and C$_1$ to C$_4$ alkoxy.

The crosslinkable compositions of this invention may be used to prepare curable coating and paint formulations, and also may contain other ingredients such as a crosslinking catalyst, fillers, pigments and the like. When cured, the coatings of this invention exhibit improved hardness properties when compared with cured coatings which do not contain the aromatic polyhydric phenol additive. The presence of the additive also serves to eliminate the problem of coating softening when the coated substrate is baked for a prolonged period of time. These cured coatings also have good weatherability, good corrosion resistance and hydrolytic stability, enhanced oxidative and radiation stability, good solvent resistance and good adhesion properties.

16 Claims, No Drawings

THERMOSET COATING COMPOSITION HAVING IMPROVED HARDNESS

BACKGROUND OF THE INVENTION

This application is related to copending application Ser. No. 07/404,028, filed on Sep. 6, 1989, and Ser. No. 07/572,754, filed on Aug. 24, 1990.

FIELD OF THE INVENTION

The present invention relates to amino-crosslinkable resin compositions, to solid crosslinked polymer compositions prepared therefrom, and to methods for improving coating properties of films and surface coatings based thereon. It also relates to methods for preparing such compositions.

DESCRIPTION OF THE RELATED ART

A primary component of crosslinkable coating formulations is a resin which can be natural or synthetic. The resin acts as a polymeric coating binder or polymeric coating vehicle for the coating formulation. In addition, most coatings require a solvent, and the coating may also contain a wide variety of additives. Further, many coatings also contain a crosslinking agent, which after application of the coating vehicle to a substrate, reacts chemically with the resin during a curing stage to produce a film containing a crosslinked network. The crosslinked network is necessary for the production of good film properties. The curing stage can be conducted at ambient conditions ("air-dry system"), or at elevated temperatures ("baked system"). In either case, the solvent is evaporated during the curing stage, resulting in a coating film. A number of properties are important for the coating film, including hardness, flexibility, weather resistance (weatherability), chemical resistance, solvent resistance, corrosion resistance, adhesion to various substrates, and impact resistance. The properties depend on many factors including type, molecular weight, monomer composition, and glass transition temperature (Tg) of the resin; type and amount of the crosslinker; curing conditions; curing catalyst; and additives. Variations of these parameters can be used to create a wide range of differences in film properties to fit requirements for a number of diverse applications. However, it is not always possible to optimize all of the desirable properties simultaneously.

Latex based coatings are environmentally superior because they are based primarily on water as a solvent or carrier. They may be applied as an air dry system and find a wide range of applications mainly as architectural coatings. However, the hardness of these coatings is low since the drying mechanism is based on the coalescence of latex particles rather than on crosslinking mechanisms.

Another type of environmentally preferred coating is based on vegetable or fish oils as binder material. Their drying mechanism is based on crosslinking of the internal double bond structure through oxidation. However, these coatings are also of low hardness.

Coatings having improved hardness may be achieved by using alkyd resins as binder materials. Alkyd resins are hybrids of vegetable oils and polyester resins. The hardness of these materials may be further increased by reduction of the fatty acid levels used in their synthesis.

Esters (oil free alkyds) can provide better hardness and improved mechanical properties but require the inclusion of crosslinking agents and thermal hardening. Typical agents are amino crosslinking agents. The hardness of polyester based coatings can usually be increased by either changing the monomer composition to increase the Tg of the polymer or by increasing the crosslinking density.

The achievement of increased hardness by increasing polymer Tg gives rise to polymers having increased viscosity which in turn may require the use of larger than desirable quantities of solvent to form solutions suitable for coating processes.

On the other hand, an increase in crosslink density of di or polyhydroxy-containing polymers (made from hydroxy functional monomers) may be achieved by increasing the concentration of the hydroxy functional groups present in the polymer. For example, polyester polymers made by condensing an organic diacid and an excess of diol and containing terminal hydroxy groups and having low molecular weights contain a greater number of terminal hydroxy groups available as crosslinking sites than do the higher molecular weight materials. Thus, an increase in hardness of such resins can be achieved simultaneously with a reduction in viscosity and a reduction of the volatile solvent content of coating and paint formulations.

However, a major drawback in the molecular weight approach for controlling hardness is that at molecular weights below about 1000, an increased amount of volatile low molecular weight fractions are produced. These volatile fractions tend to evaporate when the coating is heated to temperatures to initiate baking and crosslinking of the coating and thereby do not participate in the crosslinking reaction.

Bisphenols are well known materials used in the production of epoxy resins, polycarbonate polymers and polyester resins as well as compositions containing these products.

U.S. Pat. No. 4,124,566 discloses the preparation of polyester resins based on the polyester reaction product of aromatic dicarboxylic acids and diols, including bisphenols, by a two stage reaction wherein an aromatic dicarboxylic acid is first esterified by reaction with an aromatic monohydroxy compound, followed by a second stage reaction of this esterification product with a bisphenol compound or a mixture thereof with an aliphatic diol or dihydroxy benzene. These resins are characterized as having superior thermal stability, transparency and chemical stability. They are of relatively high molecular weight as evidenced by high reduced viscosities in excess of 0.9 for the materials produced.

U.S. Pat. No. 4,028,111 discloses polyester polymers based on an alternating polymer of an aliphatic dicarboxylic acid such as adipic acid and a bisphenol such as bisphenol A prepared using an excess of bisphenol such that the bisphenol groups also end-cap the polyester. The free hydroxy group of the bisphenol end cap is then reacted with a compound having quinonediazide groups to produce a light sensitive polymer.

U.S. Pat. No. 4,281,101 discloses the preparation of relatively high molecular weight polycarbonates comprising reacting a mixture of an aliphatic diol, a carbonic acid bis-aryl ester such as diphenyl carbonate and a diphenyl such as bisphenol A to produce a polycarbonate polymer containing diphenyl carbonate end groups of the diphenyl compound. These polymers may then be used as a precursor for further reaction with preferably aliphatic diols and phosgene to produce thermoplastic aliphatic-aromatic polycarbonate elastomers of high molecular weight. Similar polycarbonates are disclosed in U.S. Pat. Nos. 4,216,298 and 4,297,455.

U.S. Pat. No. 3,787,520 discloses a phenolic hydroxy terminated resin which may be used as a crosslinking agent in the preparation of dry powder paint systems based on crosslinkable copolymers of glycidyl methacrylate and an ethylenically unsaturated compound. The hydroxy terminated resin is prepared by reacting an epoxy compound with a diphenol such as bisphenol A to produce a polyether terminated by the diphenol.

It is also known in the art to prepare phenol terminated liquid elastomers by reacting carboxyl terminated polymers of dienes with diphenols such as bisphenol A such that a phenolic hydroxyl group forms an end group in the polymer chain. These phenol terminated elastomers are subsequently used to cross link epoxy resins to produce an improvement in impact resistance. Examples of such systems are disclosed in U.S. Pat. Nos. 3,770,698 and 3,966,837.

Crosslinked epoxy-based resin compositions having improved hardness are disclosed in U.S. Pat. No. 4,713,137. These compositions comprise, in the uncured state, a mixture of epoxy resin, a polyhydric phenolic crosslinking agent, solvent and an additive such as bisphenol-A. They polyhydric phenolic crosslinking agent may be prepared by separately reacting a hexa-alkyl ether of hexamethylol melamine and a polyhydric phenol such as bisphenol-A.

Other epoxy-based resin compositions containing an aromatic polyhydroxy additive such as bisphenol A are disclosed in U.S. Pat. No. 4,025,578 and Canadian Patent 1,042,581.

All of the above mentioned references describe the reaction of bisphenols with epoxy groups or preliminary incorporation of bisphenols in the synthesis of polycarbonate-polyester resins.

SUMMARY OF THE INVENTION

The present invention provides for amino-crosslinkable coating formulations based on a mixture of a di or polyhydroxy functional polymeric component selected from the group consisting of diesters, polyesters, alkyd polymers, acrylic polymers and polycarbonate polymers, a methylol (alkoxy methyl) amino crosslinking agent and a bis-aromatic polyhydric phenol component having the structure of formula I:

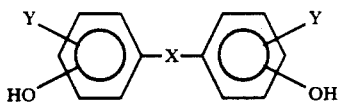

wherein X is selected from the group consisting of carbon to carbon covalent bond, oxygen, sulfur, —S—S—, —CO—, —SO—, —SO$_2$— and a divalent organic radical having a molecular weight of less than about 400, and wherein Y is independently selected from the group consisting of hydrogen, halogen, $C_1$ to $C_4$ alkyl and $C_1$ to $C_4$ alkoxy.

The crosslinkable compositions of this invention may be used to prepare curable coating and paint formulations, and also may contain other ingredients such as a crosslinking catalyst, fillers, pigments and the like. When cured, the coatings of this invention exhibit improved hardness properties when compared with cured coatings which do not contain the aromatic polyhydric phenol additive. The presence of the additive also serves to eliminate the problem of coating softening when the coated substrate is baked for a prolonged period of time. These cured coatings also have good weatherability, good corrosion resistance and hydrolytic stability, enhanced oxidative and radiation stability, good solvent resistance and good adhesion properties.

DETAILED DESCRIPTION OF THE INVENTION

The present invention is based on the fact that low molecular weight bisphenols, when they are mixed with di(poly)ols and methylol (alkoxy methyl) amino curing agents, form crosslinkable compositions which provide co-reaction of both di(poly)ols and bisphenols at baking conditions. The bisphenols may be incorporated into the polymer structure of the coatings or adhesives without the need of preliminary incorporation of the bisphenols into a polymer.

In striking difference to low molecular weight diols, the bisphenols react with methylol (alkoxy methyl)-aminocrosslinking agents rather than evaporate during the baking/crosslinking of the coatings.

As result, polymer structures, including highly crosslinked polymer structures, can be built at baking conditions with the use of very low molecular weight raw materials, and low solvent quantities.

As indicated above, the oligomeric or polymeric component of the composition of this invention may comprise a di or poly hydroxy functional polymer including a diester, a polyester, an alkyd polymer, an acrylic polymer a polycarbonate polymer, or mixtures of two or more of these materials.

Suitable diesters and polyesters are materials having the general formula II:

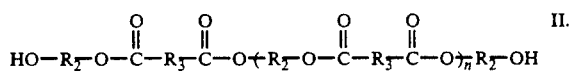

wherein n is 0 or an integer ranging from 1 to about 40, $R_2$ is a divalent aliphatic or cycloaliphatic radical containing from 2 to about 40 carbon atoms or a mixture of such radicals, and $R_3$ is a divalent aliphatic, cycloaliphatic, or aromatic radical containing from 2 to about 40 carbon atoms, or a mixture of such radicals. Obviously, when n is 0 in formula II, a simple diester is represented. When n ranges from 1 to about 40, a polyester is represented.

In the more preferred embodiments of the invention, $R_2$ is the divalent residuum of a diol containing from 2 to about 20 carbon atoms, more preferably from about 2 to 10 carbon atoms, and may also contain internal ester groups.

Some preferred examples of the diols are one or more of the following: neopentyl glycol; ethylene glycol; hexamethylenediol; 1,2-cyclohexanedimethanol; 1,3-cyclohexanedimethanol; 1,4-cyclohexanedimethanol; diethylene glycol; triethylene glycol; tetraethylene glycol; dipropylene glycol; polypropylene glycol; hexylene glycol; 2-methyl-2-ethyl-1,3-propanediol; 2-ethyl-1,3-hexandediol; 1,5-pentanediol; thiodiglycol; 1,3-propanediol; 1,2-propanediol; 1,2-butanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; neopentyl diol hydroxy methyl isobutyrate, and mixtures thereof.

$R_3$ in formula II above is the divalent residuum of a dicarboxylic acid having from 2 to abut 40 aliphatic carbon atoms, from about 5 to 40 cycloaliphatic carbon atoms or from 6 to about 40 aromatic carbon atoms, as well as mixtures of these acids. The carboxyl groups may be present in the form of anhydride groups or equivalent ester forming derivatives such as the acid halide or methyl ester. The dicarboxylic acids or derivatives are preferably one or more of the following: phthalic anhydride, terephthalic acid, isophthalic acid, adipic acid, succinic acid, glutaric acid, fumaric acid, maleic acid, cyclohexane dicarboxylic acid, azeleic acid, sebacic acid, dimer acid, pyromellitic dianhydride, substituted maleic and fumaric acids such as citraconic, chloromaleic, mesaconic, and substituted succinic acids such as aconitic and itaconic, and mixtures thereof. The most preferred acids for the purposes of this invention are linear saturated or unsaturated aliphatic dicarboxylic acids having from 2 to 10 carbon atoms such as succinic, glutaric, adipic, and similar materials.

The acrylic polymers which may be used as a polymeric component in the present invention are acrylic copolymer resins. The acrylic copolymer resin is prepared from at least one hydroxy-substituted alkyl (meth) acrylate and at least one non-hydroxy-substituted alkyl (meth) acrylate. The hydroxy-substituted alkyl (meth) acrylates which can be employed as monomers comprise members selected from the group consisting of the following esters of acrylic or methacrylic acid and aliphatic glycols: 2-hydroxyethyl acrylate, 3-chloro-2-hydroxypropyl acrylate; 1-hydroxy-2-acryloxy propane; 2-hydroxypropyl acrylate; 3-hydroxy-propylacrylate; 2,3-dihydroxypropylacrylate; 3-hydroxbutyl acrylate; 2-hydroxybutl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 1-hydroxy-2-methacryloxy propane; 2-hydroxypropyl methacrylate; 2,3-dihydroxypropyl methacrylate; 2-hydroxybutyl methacrylate; 3-hydroxybutyl methacrylate; 2-hydroxyethyl methacrylate; 4-hydroxybutylmethacrylate; 3,4-dihydroxybutyl methacrylate; 5-hydroxypentyl methacrylate; and 7-hydroxyheptyl methacrylate. Although one of ordinary skill in the art will recognize that many different hydroxy-substituted alkyl (meth)acrylates including those listed above could be employed, the preferred hydroxy functional monomers for use in preparing the acrylic resins are hydroxy-substituted alkyl (meth) acrylates having a total of 5 to 7 carbon atoms, i.e., esters of $C_2$ to $C_3$ dihydric alcohols and acrylic or methacrylic acids. Illustrative of particularly suitable hydroxy-substituted alkyl (meth)acrylate monomers are 2-hydroxyethyl methacrylate, 2-hydroxyethyl acrylate, 2-hydroxybutyl acrylate, 2-hydroxypropyl methacrylate, and 2-hydroxypropyl acrylate.

Among the non-hydroxy-substituted alkyl (meth)acrylate monomers which may be employed are alkyl (meth)acrylates (as before, meaning esters of either acrylic or methacrylic acids). Preferred nonhydroxy unsaturated monomers are esters of $C_1$ to $C_{12}$ monohydric alcohols and acrylic or methacrylic acids, e.g., methyl methacrylate, hexyl acrylate, 2-ethylhexyl acrylate, lauryl methacrylate, glycidyl methacrylate, etc. Examples of particularly suitable monomers are butyl acrylate, butyl methacrylate and methyl methacrylate.

Additionally, the acrylic copolymer resin used in the present invention may include in their composition other monomers such as acrylic acid and methacrylic acid, monovinyl aromatic hydrocarbons containing from 8 to 12 carbon atoms (including styrene, alpha-methyl styrene, vinyl toluene, t-butyl styrene, chlorostyrene and the like), vinyl chloride, vinylidene chloride, acrylonitrile, and methacylonitrile).

The acrylic copolymer preferably has a number average molecular weight not greater than 20,000, more preferably between about 200 and 6000, and most preferably between about 500 and 5000.

Alkyd polymers which may be used as the polymeric component of the composition of this invention have a formula similar to formula II above except that $R_2$ is a divalent residuum of a triol with one hydroxyl group esterified with a fatty acid. Typical triols are glycerine, trimethylol ethane and like materials. These alkyd resins are oil modified polyester resins and are broadly the product of the reaction of a dihydric alcohol and a dicarboxylic acid or acid derivative and an oil, fat or carboxylic acid derived from such oil or fat which acts as a modifier. Such modifiers are typically drying oils. The polyhydric alcohol employed is suitably an aliphatic alcohol, and mixtures of the alcohols may also be employed. The dicarboxylic acid, or corresponding anhydrides, may be selected from a variety of aliphatic carboxylic acids or mixtures of aliphatic and aromatic dicarboxylic acids. Suitable acids and acid anhydrides include, by way of example, succinic acid, adipic acid, phthalic anhydride, isophthalic acid, and bis 3,3' 4,4'-benzophenone tetracarboxylic anhydride. Mixtures of these acids and anhydrides may be employed to produce a balance of properties. As the drying oil or fatty acid there is suitably employed a saturated or unsaturated fatty acid of 12 to 22 carbon atoms or a corresponding triglyceride, that is, a corresponding fat or oil, such as those contained in animal or vegetable fats or oils. Suitable fats and oils include tall oil, castor oil, coconut oil, lard, linseed oil, palm oil, peanut oil, rapeseed oil, soybean oil and beef tallow. Such fats and oils comprise mixed triglycerides of such fatty acids as caprylic, capric, lauric, myristic, palmitic, and stearic and such unsaturated fatty acids as oleic, eracic, ricinoleic, linoleic and linolenic. Chemically, these fats and oils are usually mixtures of two or more members of the class.

Polycarbonate oligomers or polymers which may be used in preparing the compositions of this invention are hydroxy terminated polycarbonates having the general formula III:

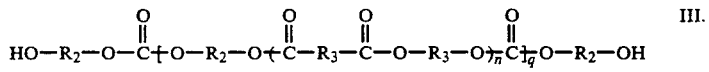

$$\text{HO} - R_2 - O - \overset{\overset{O}{\|}}{C} + O - R_2 - O + \overset{\overset{O}{\|}}{C} - R_3 - \overset{\overset{O}{\|}}{C} - O - R_3 - O + _n \overset{\overset{O}{\|}}{C} + _q O - R_2 - \text{OH} \quad \text{III.}$$

wherein q is an integer ranging from 1 to about 40, n is an integer ranging from 0 to 40, and $R_2$ and $R_3$ are as defined above. This formula includes diesters wherein n is 0 and q is 1 or greater which may be prepared by forming the condensation product of an aliphatic or cycloaliphatic diol having 2 to about 40 carbon atoms with a carbonic acid bis-aryl ester such as diphenyl carbonate, followed by subsequent polycondensation reaction of this intermediate with said diol.

Also included in formula III are polyester diols lengthened via carbonate linkages and containing terminal carbonate groups linking the lengthened polyester diol backbone to terminal hydroxy-containing end groups, in which case n in formula III is equal to or greater than 1 and q is greater than 1.

A third category of polycarbonate within the scope of formula III are polyester diols containing terminal carbonate groups linking the polyester diol backbone to hydroxy-containing end groups, in which case q in formula III is equal to 1 and n is greater than 1. These materials may be prepared by forming the condensation product of a polyester diol with a carbonic acid bis-aryl ester such as diphenyl carbonate to form the polyester-diol bis-carbonic acid ester, followed by polycondensation of this precursor with a diol to form the hydroxy terminated diesters.

The diesters and polyesters containing terminal hydroxy groups may be prepared by well known condensation processes using a molar excess of diol. Preferably the molar ratio of diol to dicarboxylic acid is $p+1:p$ wherein p represents the number of moles of dicarboxylic acid. The reaction may be conducted in the absence of or presence of an aromatic or aliphatic solvent and in the absence of or presence of a suitable polycondensation catalyst such as p-toluene sulfonic acid.

The preferred number average molecular weight (Mn) of the diesters, polyesters, alkyds, acrylics, and polycarbonate oligomers and polymers may generally range from about 200 up to about 20,000, more preferably from about 200 up to about 10,000, and most preferably from about 200 up to about 3,000 to 6,000. Glass transition temperatures (Tg) of these materials may generally range from as low as $-40°$ up to $+100°$ C. or higher.

A broad variety of bis-aromatic polyhydric phenol compounds within the scope of formula I above may be used in accordance with this invention. The main limitation with respect to these materials is that they contain two hydroxyl groups at the ortho, para or ortho/para positions available for reaction with methylol (alkoxymethyl) amino crosslinking agents when the composition is cured.

As indicated above, X in formula I may be selected from the group consisting of a carbon to carbon covalent bond, oxygen, sulfur, —S—S—, —CO—, —SO—, —SO$_2$—, and a divalent organic radical having a molecular weight of less than about 400. Included in such divalent organic radicals are divalent hydrocarbon radicals containing from 1 to 10 carbon atoms such as methylene, ethylidene and the like as well as cyclic hydrocarbons such as the residuum of tetra methylene or penta methylene. Also included are R—C—R radicals wherein R may be the same or different and is selected from the group consisting of hydrogen, $C_1$ to $C_4$ alkyl, cycloalkyl, phenyl and $CF_3$. The X linking group in formula 1 may also include the divalent residuum of a di, tri, or tetra ester having the general formula

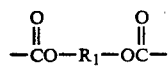

wherein $R_1$ is a divalent organic radical containing from 2 to about 20 carbon atoms as well as di, tri, and tetra esters having the formula

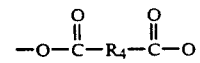

wherein $R_4$ is a divalent organic radical containing from 2 to about 10 carbon atoms.

Examples of preferred compounds are those of formula I wherein Y is hydrogen and include phenolphthalein, 2,2-bis(4-hydroxyphenyl) propane [bisphenol A], 1,1-bis(4-hydroxyphenyl) cyclohexane [bisphenol Z], 1,1-bis(4-hydroxyphenyl) ethane, bis (4-hydroxyphenyl) methane, 1,2-bis (4-hydroxyphenyl) ethane, bis (4-hydroxyphenyl) cyclohexylmethane, 3,3-bis (4-hydroxyphenyl) pentane, bis(4-hydroxyphenyl) ether, bis (4-hydroxyphenyl) sulfide, and 2,2-bis (4-hydroxyphenyl) hexafluoropropane.

Another preferred category of bis-aromatic polyhydric phenol compounds within the scope of formula I above are di, tri, and tetra esters wherein the X linking group of formula I is the divalent radical:

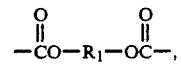

wherein $R_1$ is a divalent organic radical containing from 2 to about 20 carbon atoms. Diesters may be prepared by forming the polycondensation product of a $C_2$ to $C_{20}$ aliphatic or cycloaliphatic diol such as neopentyl glycol with a molar excess of parahydroxybenzoic acid, preferably at a 1:2 molar ratio. Triesters may be prepared by forming the polycondensation product of a triol, such as 2,2,2-trimethylol ethane, with a molar excess of parahydroxybenzoic acid, preferably at a 1:3 molar ratio. The corresponding tetra esters may be prepared by forming the polycondensation product of a tetrol, such as tetramethylol methane or erythritol, with a molar excess of parahydroxybenzoic acid, preferably at a 1:4 molar ratio.

Analgous di, tri, and tetra esters are those of formula I wherein the X linking group is the divalent radical

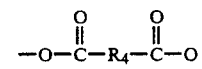

wherein $R_4$ is a divalent organic radical containing from 2 to about 10 carbon atoms. Diesters may be formed by forming the polycondensation product of a $C_2$ to $C_{10}$ aliphatic or cycloaliphatic dicarboxylic acid such as adipic acid with a molar excess of a dihydroxy benzene such as hydroquinone or resorcinol, preferably at a 1:2 molar ratio. Triesters and tetra esters may be prepared by utilizing aliphatic tri and tetra carboxylic acids as the acid reactant and at the appropriate molar ratios.

These di, tri, and tetra esters may be prepared using conventional polycondensation processes, with or without the presence of a solvent medium and with or without the use of a polycondensation catalyst such as p-toluene sulfonic acid.

The bis-aromatic polyhydric phenol may be blended with the base polymer at a blend ratio of from 1 to about 60% by weight of bisphenol, based on the weight of base polymer and the methylol (alkoxymethyl) amino-crosslinking agent taken together. More preferred compositions contain the bisphenol at a level of from about 5 to about 35% by weight, based on the weight of the base polymer and methylol(alkoxymethyl) amino crosslinking agent taken together.

The methylol(alkoxymethyl) amino crosslinking agents used in the present invention are well known commercial products. They are organic compounds of the general structural type, as shown below:

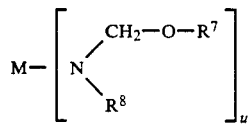

wherein:
$u \leq 2$;
$R^7 = H$, or $C_1$-$C_4$ alkyl; or $C_1$-$C_4$ alkyl
$R^8 = H$, —$CH_2$—$OR^5$,

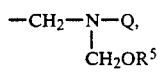

The amino crosslinking resins are produced by companies such as American Cyanamid, and Monsanto, and are made by the reaction of di(poly)amide(amine) compounds with formaldehyde and, optionally, lower alcohol.

The amino crosslinking resins that are currently produced commercially are based on:

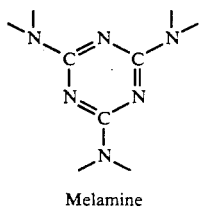

Melamine

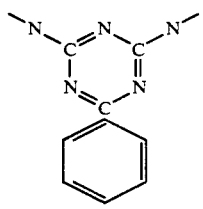

Benzoguanamine

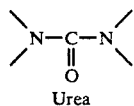

Urea

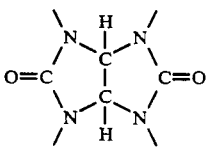

Glycoluryl

Examples of suitable amino-crosslinking resins for the diesters include:

Melamine Based

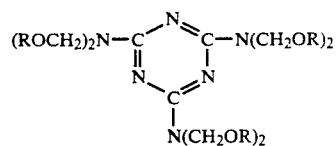

wherein R is the following:
R = $CH_3$ (Cymel ® 300, 301, 303);
R = $CH_3$, $C_2H_5$ (Cymel ® 1116);
R = $CH_3$, $C_4H_9$ (Cymel ® 1130, 1133);
R = $C_4H_9$ (Cymel ® 1156); or
R = $CH_3$, H (Cymel ® 370, 373, 380, 385)

The preferred melamine is hexamethoxymethylmelamine.

Benzoquanamine Based Resin

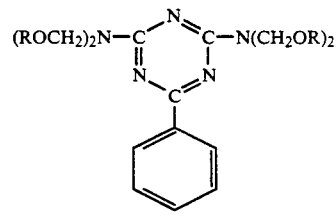

wherein R = $CH_3$, $C_2H_5$ (Cymel ® 1123)

Urea Based Resins

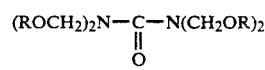

wherein
R = $CH_3$, H (Beetle 60, Beetle 65); or
R = $C_4H_9$ (Beetle 80).

Gycoluryl Based Resins

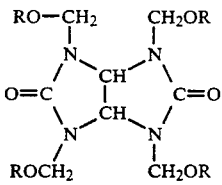

wherein:
R = $CH_3$, $C_2H_5$ (Cymel ® 1171); or
R = $C_4H_9$ (Cymel ® 1170).

In the present invention, the ratio of the active crosslinking groups, e.g., methylol (alkoxymethyl) groups of the amino crosslinking agent to the terminal hydroxy groups on the polymer is desirably from about 1.0:1.0 to 15.0:1.0, more preferably from about 1.5:1.0 to 5.0:1.0, most preferably from about 1.5:1.0 to 4.0:1.0.

On a weight basis, the amount of amino crosslinking agent effective for curing the crosslinkable binder generally ranges from about 3 to about 50 percent by weight, more preferably from about 15 to about 40 percent by weight based on the combined weight of the amino crosslinking agent, polymer and any other crosslinkable polymer constituent of the composition. In general, quantities of crosslinking agent required to cure the composition are inversely proportional to the number average molecular weight of the base polymer. Quantities of crosslinking agent on the higher side of this range are required to properly cure polymer compositions having a relatively low number average molecular weight, e.g., from about 200 to about 3,000, whereas lesser amounts of the crosslinking agent are required to properly cure polymers having a higher number average molecular weight, e.g., from about 3,000 up to about 10,000.

The present invention also provides for a novel coating composition formed by combining the oligomeric or polymeric component, the bisphenol component, an amino crosslinking agent, and optionally a solvent. Application of the formulated coating can be made via conventional methods such as spraying, roller coating, dip coating, etc., and then the coated system may be cured by baking.

The same or different solvent(s) which are optionally used during the synthesis of the oligomers or polymeric component to dissolve reactants may also be added during the formulation of the coating composition to adjust viscosity so as to provide a formulation with a viscosity usually between about 10 centipoise to 10 poise. One or more solvents can be used. In many cases, a single solvent is used to solubilize the system. However, in other cases it is often desirable to use mixtures of solvents in order to effect the best solubilization, and in particular a combination of aromatic solvents with oxygenated solvents is preferred. Suitable aromatic solvents include toluene, xylene, ethylbenzene, tetralin, naphthalene, and solvents which are narrow cut aromatic solvents comprising $C_8$ to $C_{13}$ aromatics such as those marketed by Exxon Company U.S.A. under the name Aromatic 100, Aromatic 150, and Aromatic 200. The oxygenated solvents should not be extremely polar such as to become incompatible with the aromatic solvents. Suitable oxygenated solvents include propylene glycol monomethyl ether acetate, propylene glycol propyl ether acetate, ethyl ethoxypropionate, dipropylene glycol monomethyl ether acetate, propylene glycol monomethyl ether, propylene glycol monopropyl ether, dipropylene glycol monomethyl ether, diethylene glycol monobutyl ether acetate, ethylene glycol monoethyl ether acetate, ethylene glycol monobutyl ether acetate, ethylene glycol monoethyl ether, ethylene glycol monobutyl ether, diethylene glycol monoethyl ether, diethylene glycol monoethyl ether acetate, Dibasic ester (a mixture of esters of dibasic acids marketed by DuPont), ethyl acetate, n-propyl acetate, isopropyl acetate, butyl acetate, isobutyl acetate, amyl acetate, isoamyl acetate, mixtures of hexyl acetates such as those sold by Exxon Chemical Company under the brand name EXXATE® 600, mixtures of heptyl acetates such as those sold by Exxon Chemical Company under the brand name EXXATE® 700, acetone, methyl ethyl ketone, methyl isobutyl ketone, methyl amyl ketone, methyl isoamyl ketone, methyl heptyl ketone, isophorone, isopropanol, n-butanol, sec.-butanol, isobutanol, amyl alcohol, isoamyl alcohol, hexanols, and heptanols. The list should not be considered as limiting, but rather as examples of solvents which are useful in the present invention. The type and concentration of solvents are generally selected to obtain formulation viscosities and evaporation rates suitable for the application and baking of the coatings. Typical solvent concentrations in the formulations range from 0 to about 75% by weight with a preferred range between about 5 and 50% by weight and a most preferred range between about 10 and 40% by weight. For the preparation of high solids coatings, the amount of solvent used in the coating formulation is preferably less than 40% of the weight of the formulation.

Satisfactory baking schedules for formulations of the present invention vary widely including, but not limited to, low temperature bakes of about 20 to 30 minutes at temperatures between 200° and 220° F. for large equipment applications and high temperature bakes of about 5 to 10 seconds in 600° to 700° F. air for coil coating applications. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

Required baking schedules also depend on the type and concentration of catalysts added to the formulations and on the thickness of the applied coating film. In general, thinner films and coatings with higher concentrations of catalyst cure more easily, i.e., at lower temperatures and/or shorter baking times.

Acid catalysts may be used to cure systems containing hexamethoxymethyl melamine and other amino crosslinking agents, and a variety of suitable acid catalysts are known to one skilled in the art for this purpose. These include, for example, p-toluene sulfonic acid, methane sulfonic acid, nonylbenzene sulfonic acid, dinonylnapthalene disulfonic acid, dodecylbenzene sulfonic acid, phosphoric acid, phosphorous acid, phenyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc. products with the tradename K-CURE®. Examples of blocked catalysts are the King Industries, Inc. products with the tradename NACURE®.

The amount of catalyst employed typically varies inversely with the severity of the baking schedule. In particular, smaller concentrations of catalyst are usually required for higher baking temperatures or longer baking times. Typical catalyst concentrations for moderate baking conditions (15 to 30 minutes at 275° F.) would be about 0.3 to 0.5 wt. % catalyst solids per diester plus crosslinking agent solids. Higher concentrations of catalyst up to about 2 wt. % may be employed for cures at lower temperature or shorter times. Formulations containing sufficient residual esterification catalyst, such as phosphorous acid, may not require the inclusion of any additional crosslinking catalyst to effect a proper cure at lower curing temperatures.

In the case of formulations of this invention containing hexamethoxymethyl melamine as the crosslinking agent and p-toluene sulfonic acid as the catalyst, preferred curing conditions at dry film thickness of about 1 mil are catalyst concentration between about 0.05 and 0.6 wt. %, based on polymer solids plus crosslinking agent solids, baking temperature between 200° and 400° F. and baking time between about 5 and 60 minutes. Most preferred curing conditions are catalyst concentration between about 0.05 and 0.3 wt. %, baking temperature between about 250 and 350° F. and baking time between about 20 and 40 minutes.

As described above, the formulations of this invention are characterized by improved weather resistance. However, additional improvements in this and other properties can be achieved by including stabilizers and stabilizing systems into the formulation. Among compounds providing improvements in weather resistance are HALS (hindered amine light stabilizers), UV-screeners, other antioxidants, etc.

To achieve the desired color, the composition can be formulated with one or a mixture of various pigments. If pigment is added to the coating formulation, then the ratio of pigment to polymer component and amino crosslinking agent desirably ranges from about 0.5:1.0 to 5.0:1.0, preferably from about 0.8:1.0: to 3.0:1.0.

Another formulating tool to improve weather resistance are silicone resins used to replace part of the polymer component of the composition and impart better weather resistance to the whole system. All of these formulating approaches can be used with the compositions of the present invention.

The polymeric or oligomeric components of this invention may also be blended with other crosslinkable polymer materials to improve the physical and chemical properties of the latter. Examples of suitable blend polymers include acrylic and methacrylic polymers and copolymers, epoxy resins, alkyd resins, epoxy/phenolic resins, epoxy/acrylic resins, aromatic and aliphatic urethane polymers, chlorinated rubber, nitrocellulose and other polyester resins. Respective blend ratios of 1:20 to 20:1 may be used. The composition of this invention is particularly effective in improving the chemical resistance of alkyd resins when blended therewith at levels of from about 5 to 25% by weight.

The following examples illustrate but are not intended to limit the scope of this invention.

EXAMPLE 1

A polyester resin is prepared by the following process:

Into a 5 liter four-necked flask equipped with a mechanical stirrer, heating mantle, nitrogen sparger, 10 inch column packed with glass beads on top of which is a Dean Stark trap and chilled water condenser, and thermometer fitted with temperature controller, are charged 1373 g. neopentyl glycol (NPG), 1445.4 g. adipic acid (AA), and 660.0 g. Aromatic 100 solvent (a narrow-cut solvent of $C_8$–$C_{10}$ aromatics marketed by Exxon Company, U.S.A.). The contents are heated to melting, stirred, and heating is continued to 150° C. where the solvent-water azeotrope starts to distill out. The solvent phase is continuously removed from the Dean Stark trap and returned to the flask. Water removal is used to monitor the reaction. The temperature is raised periodically to keep water removal at an appreciable rate. Heating is continued and the temperature allowed to rise as the water is removed to a final temperature of 210° C. The reaction is stopped after 430 g. water phase has been removed, which is equivalent to the theoretical amount of water plus unreacted NPG. The reaction takes about 10 hrs. The product is cooled and discharged. The product has an NVM (non-volatile matter) content of 76.8% by weight and its composition can be abbreviated as follows: NPG/AA:4/3.

EXAMPLE 2

A polyester resin was prepared by the process of Example 1, except that the molar ratio of NPG and AA was different such as to yield a polyester resin with an NPG/AA ratio of 3/2. The recovered product had a non-volatile matter content of 87.3% by weight.

EXAMPLE 3

A third polyester resin was prepared by the process of Example 1, except that the molar ratio of NPG and AA was different such as to yield a polyester resin with an NPG/AA ratio of 2.5/1.5. The recovered product had a non-volatile matter content of 89.3% by weight.

EXAMPLE 4 (DE-1)

This example sets forth the preparation of a diester of NPG and AA.

Into an apparatus as described in Example 1 were introduced 1872 g. of NPG, 1314 g. of AA and 200 g. of Aromatic 100 solvent. This mixture was reacted according to the process set forth in Example 1 except that the final reaction temperature was 230° C. and the reaction time was 10.5 hrs. The reaction was stopped after 772 g. of water phase containing water plus unreacted NPG was removed, which represents 87.6% of the theoretical yield. The acid number of the diester product was 2.2. The product had an NPG/AA ratio of 2/1 and a non-volatile matter content of 87.9% by weight.

Five clear polymer masterbatches were prepared using the polyester and diester compositions prepared in accordance with Examples 1–4 and also a commercially available alkyd resin (Reichold alkyd resin 12–512) as polymeric components. These masterbatches were prepared by mixing the polymeric components with solvent and a hexamethoxymethyl melamine (HMMM) crosslinking agent (Cymel ® 303 from American Cyanamid Co.). The components were introduced into a container, the container was sealed, placed on a roller and mixed until a homogeneous solution was obtained. The container was then allowed to stand 30 minutes to remove air bubbles.

The five masterbatches prepared were designated as follows and had the following composition:
PE-1:
 228 g of the polyester composition of Example 2
 98 g of HMMM
 46 g. of methyl amyl ketone
PE-2:
 268 g. of the polyester composition of Example 1
 70 g of HMM
PE-3:
 108 g. of the polyester composition of Example 3
 41 g. of HMMM
 53 g. of n-butyl alcohol
ALK-1:
 200 g. of alkyd resin
 67 g. of HMMM
 67 g. of methyl amyl ketone
De-1:
 435 g. of the diester composition of Example 4
 197 g. of HMMM In order to facilitate the preparation of a number of different formulations within the scope of this invention, four different masterbatches containing various species of bis-aromatic polyhydric phenol hardening agents within the scope of this invention were prepared by the same mixing process as set forth above. The hardening agents employed in formulating these masterbatches were bisphenol-A (BPA), phenolphthalein (PhPh) and a diester designated as DE-2 which has the formula:

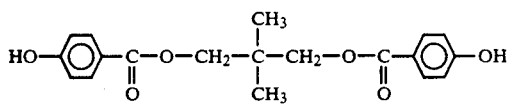

and which was prepared as set forth in Example 5.

EXAMPLE 5

Into a 2 liter four-necked flask equipped with a mechanical stirrer, a heating mantle, nitrogen sparger, 10 inch column packed with glass beads on top of which is a Dean Stark trap and chilled water condenser, and thermometer fitted with temperature controller are charged with 312 g. NPG, 840 g. parahydroxybenzoic acid (PHBA), 200 g xylene and 6 g. methane sulfonic acid (MSA).

The contents are heated to melting, stirred, and heating is continued to 125° C. where the solvent-water azeotrope starts to distill out. The solvent phase is continuously removed from the Dean Stark trap and returned to the flask. Water removal is used to monitor the reaction. The temperature is raised periodically to keep water removal at appreciable rate. Heating is continued and the temperature allowed to rise as the water is removed to a final temperature of 170° C. The reaction is stopped after 111.3 g. of water phase has been removed, which is equivalent to the theoretical amount of water plus a small amount of unreacted NPG. The reaction takes about 6 hours. The product is cooled, dissolved in acetone, precipitated in a solution of 2% NaHCO$_3$ in water and dried at room temperature. Its composition can be abbreviated as follows: NPG/PHBA:½.

The four hardener masterbatches prepared were designated as follows and had the following composition:

BPA-1:
114 g. of BPA
130 g. of HMMM
81 g. of methyl amyl ketone
163 g. of n-butyl alcohol BPA-2:
140 g. of BPA
160 g. of HMMM
200 g. of n-butyl alcohol PhPh-1:
158 g. of PhPh
130 g. of HMMM
128 g. of n-butyl alcohol
160 g. of dimethyl sulfoxide DE-2:
171 g. of diester composition of Example 5
129 g. of HMMM
200 g. of n-butyl alcohol Coating formulations were prepared by blending with stirring the appropriate master batches, and para toluene sulfonic acid was added to the various formulations as a curing catalyst. The various formulations, the curing conditions and the hardness and impact resistance of the coatings applied to test panels are shown in Examples 6-78 in the following tables.

Test panels were prepared and evaluated as follows:
Thin films of the formulation of Examples 6-78 were applied to steel test panels via drawdowns and/or air spray. The basic procedures are outlined in ASTM Test Procedure D823-87, Methods A and E. Test panels are either untreated Type QD or Type S cold rolled steel panels obtained from the Q-Panel Company or polished Bonderite 1000 (iron-phosphate treatment) panels obtained from the Parker-Amchem Company. Panel sizes are either 4"×8", 3"×6", 6"×12", or 3"×5".

A model 310277 Automatic Test Panel Spray Machine made by Spraymation, Inc. is used to spray panels (Method A above); wire-wound drawdown rods and in some cases a Precision Laboratory Drawdown machine (both from the Paul N. Gardner Company) are used to apply films via hand-pulled drawdowns (Method E). Target dry film thicknesses are 1 mil.

The film property evaluations conducted on the cured panels were as follows:
Knoop Hardness—ASTM D-1474
Direct Impact—ASTM D-2794
Reverse Impact—ASTM D-2794

In the case of the impact tests, a ⅝ inch punch with a 0.64 inch die was employed.

The hardness and impact results set forth in the Tables clearly demonstrate that cured resin formulations within the scope of this invention exhibit a marked increase in hardness as a function of the quantity of hardening agent present in the composition, while at the same time the good impact properties of the cured formulation are maintained or even enhanced where lower levels of hardener are present in the composition.

TABLE 1

| EXAMPLE NO. | MASTER BATCHES BLENDED | | RESIN/ BISPHENOL (1) | BAKING TIME MIN @ 300 F. (2) | KNOOP HARDNESS | REVERSE IMPACT, IN. LBS. |
|---|---|---|---|---|---|---|
| | PE-1, WT., g. | BPA-1, WT., g. | | | | |
| 6 | 26 | 0 | 100/0 | 20 | V.S. (3) | 59 |
| 7 | 26 | 0 | 100/0 | 40 | V.S. (3) | 55 |
| 8 | 24.7 | 3 | 95/5 | 20 | V.S. (3) | 53 |
| 9 | 24.7 | 3 | 95/5 | 40 | V.S. (3) | 65 |
| 10 | 23.4 | 6 | 90/10 | 20 | 3.8 | 56 |
| 11 | 23.4 | 6 | 90/10 | 40 | 7.0 | 75 |
| 12 | 22.1 | 9 | 85/15 | 20 | 6.3 | 79 |
| 13 | 22.1 | 9 | 85/15 | 40 | 8.0 | 46 |
| 14 | 20.8 | 12 | 80/20 | 20 | 7.8 | 53 |
| 15 | 20.8 | 12 | 80/20 | 40 | 12.0 | 28 |
| 16 | 19.5 | 15 | 75/25 | 20 | 11.7 | 30 |
| 17 | 19.5 | 15 | 75/25 | 40 | 13.5 | 20 |
| 18 | 18.2 | 18 | 70/30 | 20 | 12.2 | — |

TABLE 1-continued

| EXAMPLE NO. | MASTER BATCHES BLENDED | | RESIN/ BISPHENOL (1) | BAKING TIME MIN @ 300 F. (2) | KNOOP HARDNESS | REVERSE IMPACT, IN. LBS. |
|---|---|---|---|---|---|---|
| | PE-1, WT., g. | BPA-1, WT., g. | | | | |
| 19 | 18.2 | 18 | 70/30 | 40 | 15.3 | 20 |

(1) WT. RATIO OF THE CONTAINED RESIN TO THE CONTAINED BISPHENOL
(2) 0.4% OF p-TSA CATALYST WAS USED
(3) VERY SOFT: TOO SOFT TO MEASURE ON KNOOP INSTRUMENT

TABLE 2

| EXAMPLE NO. | MASTER BATCHES BLENDED | | RESIN/ BISPHENOL (1) | BAKING TIME MIN @ 300 F. (2) | KNOOP HARDNESS | REVERSE IMPACT, IN. LBS. |
|---|---|---|---|---|---|---|
| | PE-2, WT., g. | BPA-1, WT., g. | | | | |
| 20 | 23.6 | 0 | 100/0 | 20 | V.S. (3) | 59 |
| 21 | 23.6 | 0 | 100/0 | 40 | V.S. (3) | 106 |
| 22 | 22.5 | 3 | 95/5 | 20 | V.S. (3) | 50 |
| 23 | 22.5 | 3 | 95/5 | 40 | V.S. (3) | 66 |
| 24 | 21.3 | 6 | 90/10 | 20 | V.S. (3) | 89 |
| 25 | 21.3 | 6 | 90/10 | 40 | V.S. (3) | 76 |
| 26 | 20.1 | 9 | 85/15 | 20 | V.S. (3) | 82 |
| 27 | 20.1 | 9 | 85/15 | 40 | V.S. (3) | 76 |
| 28 | 19.9 | 12 | 80/20 | 20 | 5.1 | 46 |
| 29 | 19.9 | 12 | 80/20 | 40 | 7.1 | 70 |
| 30 | 17.7 | 15 | 75/25 | 20 | 8.9 | 50 |
| 31 | 17.7 | 15 | 75/25 | 40 | 8.9 | 26 |
| 32 | 16.6 | 18 | 70/30 | 20 | 10.5 | 43 |
| 33 | 16.6 | 18 | 70/30 | 40 | 11.8 | 20 |

(1) WT. RATIO OF THE CONTAINED RESIN TO THE CONTAINED BISPHENOL
(2) 0.4% OF p-TSA CATALYST WAS USED
(3) VERY SOFT: TOO SOFT TO MEASURE ON KNOOP INSTRUMENT

TABLE 3

| EXAMPLE NO. | MASTER BATCHES BLENDED | | RESIN/ BISPHENOL (1) | BAKING TIME MIN @ 350 F. (2) | KNOOP HARDNESS | REVERSE IMPACT, IN. LBS. |
|---|---|---|---|---|---|---|
| | DE-1, WT., g. | BPA-1, WT., g. | | | | |
| 34 | 19.3 | 0 | 100/0 | 30 | V.S. (3) | 73 |
| 35 | 17.4 | 5 | 90/10 | 30 | 6.4 | 87 |
| 36 | 15.4 | 10 | 80/20 | 30 | 12.0 | 47 |
| 37 | 13.5 | 15 | 70/30 | 30 | 16.4 | 27 |

(1) WT. RATIO OF THE CONTAINED RESIN TO THE CONTAINED BISPHENOL
(2) 0.4% OF p-TSA CATALYST WAS USED
(3) VERY SOFT: TOO SOFT TO MEASURE ON KNOOP INSTRUMENT

TABLE 4

| EXAMPLE NO. | MASTER BATCHES BLENDED | | RESIN/ BISPHENOL (1) | BAKING TIME MIN @ 350 F. (2) | KNOOP HARDNESS | REVERSE IMPACT, IN. LBS. |
|---|---|---|---|---|---|---|
| | DE-1, WT., g. | DE-2, WT., g. | | | | |
| 38 | 17 | 0 | 100/0 | 30 | V.S. (3) | 73 |
| 39 | 15.3 | 3 | 90/10 | 30 | 5.4 | 87 |
| 40 | 13.6 | 6 | 80/20 | 30 | 7.5 | 67 |
| 41 | 11.9 | 9 | 70/30 | 30 | 13.4 | 47 |

(1) WT. RATIO OF THE CONTAINED RESIN TO THE CONTAINED BISPHENOL
(2) 0.4% OF p-TSA CATALYST WAS USED
(3) VERY SOFT: TOO SOFT TO MEASURE ON KNOOP INSTRUMENT

TABLE 5

| EXAMPLE NO. | MASTER BATCHES BLENDED | | RESIN/ BISPHENOL (1) | BAKING TIME MIN @ 350 F. (2) | KNOOP HARDNESS | REVERSE IMPACT, IN. LBS. |
|---|---|---|---|---|---|---|
| | PE-3, WT., g. | BPA-1, WT., g. | | | | |
| 42 | 24.5 | 0 | 100/0 | 30 | V.S. (3) | 56 |
| 43 | 22.0 | 5 | 90/10 | 30 | V.S. (3) | 59 |
| 44 | 19.6 | 10 | 80/20 | 30 | 9.2 | 43 |
| 45 | 17.1 | 20 | 70/30 | 30 | 13.0 | 33 |

(1) WT. RATIO OF THE CONTAINED RESIN TO THE CONTAINED BISPHENOL
(2) 0.4% OF p-TSA CATALYST WAS USED
(3) VERY SOFT: TOO SOFT TO MEASURE ON KNOOP INSTRUMENT

TABLE 6

| EXAMPLE NO. | MASTER BATCHES BLENDED | | RESIN/ BISPHENOL (1) | BAKING TIME MIN @ 350 F. (2) | KNOOP HARDNESS | REVERSE IMPACT, IN. LBS. |
|---|---|---|---|---|---|---|
| | PE-3, WT., g. | DE-2 WT., g. | | | | |
| 46 | 21.5 | 0 | 100/0 | 30 | V.S. (3) | 56 |
| 47 | 19.3 | 3 | 90/10 | 30 | V.S. (3) | 79 |
| 48 | 17.2 | 6 | 80/20 | 30 | 6.2 | 79 |
| 49 | 15.0 | 9 | 70/30 | 30 | 9.3 | 63 |

(1) WT. RATIO OF THE CONTAINED RESIN TO THE CONTAINED BISPHENOL
(2) 0.4% OF p-TSA CATALYST WAS USED
(3) VERY SOFT: TOO SOFT TO MEASURE ON KNOOP INSTRUMENT

TABLE 7

| EXAMPLE NO. | MASTER BATCHES BLENDED | | RESIN/ BISPHENOL (1) | BAKING TEMP., DEG F. FOR 25 MIN. (2) | KNOOP HARDNESS | IMPACT, IN LBS. | |
|---|---|---|---|---|---|---|---|
| | PE-1, WT., g. | PhPh-1 WT., g. | | | | REVERSE | DIRECT |
| 50 | 12.0 | 0 | 100/0 | 300 | V.S. (3) | 59 | — |
| 51 | 10.7 | 9 | 70/30 | 300 | 14.0 | 136 | 144 |
| 52 | 10.7 | 9 | 70/30 | 350 | 15.5 | 0 | 44 |
| 53 | 9.2 | 12 | 60/40 | 300 | 15.6 | 40 | 62 |
| 54 | 9.2 | 12 | 60/40 | 350 | 20.1 | 0 | 30 |
| 55 | 7.7 | 15 | 50/50 | 300 | 20.3 | 8 | 42 |
| 56 | 7.7 | 15 | 50/50 | 350 | 23.3 | 0 | 22 |

(1) WT. RATIO OF THE CONTAINED RESIN TO THE CONTAINED BISPHENOL
(2) 0.2% OF p-TSA CATALYST WAS USED
(3) VERY SOFT: TOO SOFT TO MEASURE ON KNOOP INSTRUMENT

TABLE 8

| EXAMPLE NO. | MASTER BATCHES BLENDED | | RESIN/ BISPHENOL (1) | BAKING TIME MIN @ 300 F. (2) | KNOOP HARDNESS | REVERSE IMPACT, IN. LBS. |
|---|---|---|---|---|---|---|
| | ALK-1, WT., g. | BPA-1 WT., g. | | | | |
| 57 | 23.3 | 0 | 100/0 | 20 | 4.7 | 66 |
| 58 | 23.3 | 0 | 100/0 | 40 | 4.5 | 66 |
| 59 | 22.2 | 3 | 95/5 | 20 | 7.1 | 30 |
| 60 | 22.2 | 3 | 95/5 | 40 | 9.6 | 23 |
| 61 | 21.0 | 6 | 90/10 | 20 | 10.1 | 20 |
| 62 | 21.0 | 6 | 90/10 | 40 | 11.1 | <10 |
| 63 | 19.8 | 9 | 85/15 | 20 | 13.0 | 26 |
| 64 | 19.8 | 9 | 85/15 | 40 | 13.5 | <10 |
| 65 | 18.7 | 12 | 80/20 | 20 | 19.0 | 13 |
| 66 | 18.7 | 12 | 80/20 | 40 | 18.1 | <10 |
| 67 | 17.5 | 15 | 75/25 | 20 | 17.0 | 7 |
| 68 | 17.5 | 15 | 75/25 | 40 | 19.1 | <10 |
| 69 | 16.3 | 18 | 70/30 | 20 | 19.7 | 0 |
| 70 | 16.3 | 18 | 70/30 | 40 | 23.0 | <10 |

(1) WT. RATIO OF THE CONTAINED RESIN TO THE CONTAINED BISPHENOL
(2) 0.4% OF p-TSA CATALYST WAS USED

TABLE 9

| EXAMPLE NO. | MASTER BATCHES BLENDED | | RESIN/ BISPHENOL (1) | BAKING TIME MIN @ 350 F. (2) | KNOOP HARDNESS | REVERSE IMPACT, IN. LBS. |
|---|---|---|---|---|---|---|
| | DE-1, WT., g. | DE-2 WT., g. | | | | |
| 71 | 33.2 | 26.3 | 70/30 | 30 | 5.2 | 200 |
| 72 | 28.45 | 35.1 | 60/40 | 30 | 9.2 | 102 |
| 73 | 23.7 | 43.9 | 50/50 | 30 | 17.3 | 16 |
| 74 | 19.0 | 52.7 | 40/60 | 30 | 23.3 | 7 |

(1) WT. RATIO OF THE CONTAINED RESIN TO THE CONTAINED BISPHENOL
(2) 0.1% OF $H_3PO_4$ CATALYST WAS USED

TABLE 10

| EXAMPLE NO. | MASTER BATCHES BLENDED | | RESIN/ BISPHENOL (1) | BAKING TIME MIN @ 350 F. (2) | KNOOP HARDNESS | REVERSE IMPACT, IN. LBS. |
|---|---|---|---|---|---|---|
| | DE-1, WT., g. | BPA-2 WT., g. | | | | |
| 75 | 33.2 | 32.1 | 70/30 | 30 | 19.0 | 66 |
| 76 | 28.45 | 42.8 | 60/40 | 30 | 22.5 | 7 |
| 77 | 23.7 | 53.5 | 50/50 | 30 | 25.8 | <7 |
| 78 | 19.0 | 64.2 | 40/60 | 30 | 32.3 | <7 |

(1) WT. RATIO OF THE CONTAINED RESIN TO THE CONTAINED BISPHENOL
(2) 0.1% OF $H_3PO_4$ CATALYST WAS USED

What is claimed is:

1. A crosslinkable coating composition comprising a mixture of:

a) a diester or polyester polymer having the structure:

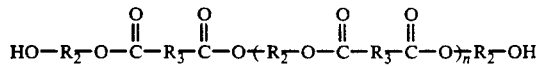

wherein n is 0 or an integer ranging from 1 to about 40, $R_2$ is a divalent aliphatic or cycloaliphatic radical containing from 2 to about 40 carbon atoms or a mixture of such radicals, and $R_3$ is a divalent aliphatic, cycloaliphatic or aromatic radical containing from 2 to about 40 carbon atoms, or a mixture of such radicals, said polymer further characterized as having a number average molecular weight within the range of about 200 to about 20,000;

b) a bis-aromatic polyhydric phenol having the structure:

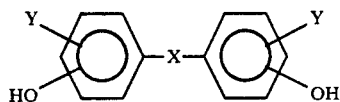

wherein X is selected from the group consisting of carbon to carbon covalent bond, oxygen, sulfur, —S—S—, —CO—, —SO—, —SO$_2$— and a divalent hydrocarbon radical containing from 1 to 10 carbon atoms, and wherein Y is independently selected from the group consisting of hydrogen, halogen, $C_1$ to $C_4$ alkyl and $C_1$ to $C_4$ alkoxy; and c) a methylol (alkoxymethyl) amino crosslinking agent present in an amount effective to crosslink the composition.

2. The composition of claim 1 wherein Y is hydrogen and each OH substituent is in the para position.

3. The composition of claim 1 wherein said polyhydric phenol is present in said composition at a level of from about 1 to about 60% by weight based on the combined weight of said polymer and amino crosslinking agent taken together.

4. The composition of claim 3 wherein said polyhydric phenol is present at a level of from about 5 to about 35% by weight, based on the combined weight of said polymer and amino crosslinking agent taken together.

5. The composition of claim 1 wherein said polymer has a number average molecular weight within the range of about 200 to about 10,000.

6. The composition of claim 3 wherein X is a divalent hydrocarbon radical containing from 1 to 10 carbon atoms.

7. The composition of claim 6 wherein said polyhydric phenol is bisphenol-A.

8. The composition of claim 2 wherein n is 0.

9. The composition of claim 2 wherein n ranges from 1 to about 40.

10. The composition of claim 8 wherein said diester is the condensation product of neopentyl glycol and adipic acid present in a respective molar ratio of about 2 to 1.

11. The composition of claim 9 wherein said polyester is the condensation product of neopentyl glycol and adipic acid, present at a respective molar ratio of p+1 to p wherein p is the number of moles of adipic acid.

12. The composition of claim 3 wherein said methylol (alkoxymethyl) amino crosslinking agent is present at a level of from about 3 to about 50 percent by weight, based on the combined weight of crosslinking agent and crosslinkable polymer components.

13. The composition of claim 12 wherein said amino crosslinking agent is hexamethoxymethyl melamine.

14. The composition of claim 3 wherein the number average molecular weight of said polymer is within the range of from about 200 to about 6,000.

15. The composition of claim 14 wherein said number average molecular weight ranges from about 200 to about 3,000.

16. The composition of claim 3 further containing an organic solvent.

* * * * *